United States Patent [19]
Hedrick et al.

[11] Patent Number: 5,890,459
[45] Date of Patent: Apr. 6, 1999

[54] SYSTEM AND METHOD FOR A DUAL FUEL, DIRECT INJECTION COMBUSTION ENGINE

[75] Inventors: John C. Hedrick, Boerne; Gary Bourn, San Antonio, both of Tex.

[73] Assignee: Southwest Research Institute, San Antonio, Tex.

[21] Appl. No.: 927,608

[22] Filed: Sep. 12, 1997

[51] Int. Cl.⁶ .................................................. F02B 43/00
[52] U.S. Cl. .................... 123/27 GE; 123/525; 123/526; 123/527; 123/299; 123/300
[58] Field of Search ............... 123/27 GE, 525, 123/526, 527, 529, 299, 300

[56] References Cited

U.S. PATENT DOCUMENTS

| | | | |
|---|---|---|---|
| 4,414,940 | 11/1983 | Loyd | 123/299 |
| 4,543,930 | 10/1985 | Baker | 123/299 |
| 4,742,804 | 5/1988 | Kelgard | 123/256 |
| 5,060,610 | 10/1991 | Paro | 123/300 |
| 5,072,706 | 12/1991 | Eblen et al. | 123/299 |
| 5,297,520 | 3/1994 | Danyluk | 123/299 |
| 5,365,902 | 11/1994 | Hsu | 123/299 |
| 5,477,830 | 12/1995 | Beck et al. | 123/470 |

OTHER PUBLICATIONS

G.B. O'Neal 1982 "The Diesel–Gas Dual–Fuel Engine," Symposium Paper, Non–petroleum Vehicular Fuels III, Institute of Gas Technology.

G.A. Karim 1987 "The Dual Fuel Engine," *Automotive Engine Alternatives,* Robert L. Egans (ed.), Plenum Press, New York.

J.F. Wakenell, G.B. O'Neal, and Q.A. Baker 1987 "High–Pressure Late Cycle Direct Injection of Natural Gas in a Rail Medium Speed Diesel Engine," SAE Paper No. 872041.

S. Shundoh, M. Komori, and K. Tsujimura 1992 "$NO_x$ Reduction from Diesel Combustion Using Pilot Injection with High Pressure Fuel Injection," SAE Paper No. 920461.

*Primary Examiner*—Henry C. Yuen
*Assistant Examiner*—Hai Huynh
*Attorney, Agent, or Firm*—Jenkens & Gilchrist

[57] ABSTRACT

A standard diesel injection system and a mechanical direct-gas injection system are selectively operable, in combination with a continuous pilot injection system, to provide a combustion system that is capable of operating in either a conventional diesel mode or a dual-fuel mode. Operation between convention diesel or dual-fuel combustion modes is mechanically controlled by a two-position, four-way control valve. The mechanical direct-gas injection system is actuated by pulsed diesel fuel directed to the actuation chamber of a gas injector by the same injection pump used to provide diesel fuel to the combustion chamber during conventional diesel operation.

4 Claims, 2 Drawing Sheets

SYSTEM AND METHOD FOR A DUAL FUEL, DIRECT INJECTION COMBUSTION ENGINE

BACKGROUND OF THE INVENTION

1. Technical Field

The present invention is directed to a system and method for operating a diesel engine in both conventional diesel and dual fuel operating modes, and more particularly to such a system and method in which a pulsed flow of diesel fuel is continuously introduced into the combustion chamber of the engine through a pilot injector during operation in both operating modes.

2. History of Related Art

Increasing concern over exhaust emissions regulation and fuel efficiency have led to an interest in burning a combustible gaseous mixture, such as propane or natural gas in diesel engines, particularly in diesel engines used in stationary, marine, and locomotive applications. Many of these applications use dual fuel combustion systems due to the requirement that diesel operation capability be retained, due to either limited refueling infrastructure, intermittent operation, or limited on-board fuel storage capability. Current dual fuel combustion systems are either homogeneous or heterogeneous gas-air charge systems, and each have distinct advantages and disadvantages.

Homogeneous charge duel fuel combustion systems typically require a reduction in compression ratio and/or a reduction in inlet air temperature to avoid undesirable early detonation of the gas-air charge. This problem is discussed in a Non-Petroleum Vehicular Fuels III Symposium paper *The Diesel-Gas Dual-Fuel Engine*, by G. B. O'Neal, Published by the Institute of Gas Technology, 1982. Natural gas composition and mixing of the gas-air charge are concerns with homogeneous charge dual-fuel systems, as they greatly affect the potential for detonation and combustion rate. Generally, either some form of load control, i.e., throttling or waste gate, is required for starting and/or light-load operation, or the engine operates on undiluted diesel fuel under those conditions. Such a dual fuel engine is described in an article titled *The Dual Fuel Engine* by G. A. Karim, appearing in *Automotive Engine Alternatives*, Robert L. Evans editor, Plenum Press, New York, 1987. Although diesel efficiency can be matched and significant reductions in oxides of nitrogen ($NO_x$) emissions are obtained when operating in a homogeneous dual-fuel mode at rated conditions, the engine modifications required for dual-fuel operation cause substantial loss in efficiency when operating at reduced load or on 100% diesel fuel. Also, increased cold start and light load emissions occur, along with reduced efficiency, if the engine is unthrottled and operates on 100% diesel fuel at reduced compression ratios.

Heterogeneous, i.e., stratified, charge dual-fuel combustion systems typically feature direct injection of natural gas late in the compression cycle. By injecting natural gas at high pressure late in the cycle, premature detonation is avoided and no modifications to the inlet air and compression chamber are required. This operation is described in SAE Paper No. 872041, titled *High-Pressure Late Cycle Direct Injection of Natural Gas in a Rail Medium Speed Diesel Engine*, authored by J. F. Wakenell, G. D. O'Neal, and Q. A. Baker. Normal diesel operation is retained in the described engine operation without penalties in emissions or efficiency. In the dual-fuel operation mode, natural gas is stratified within the combustion chamber and burned in a manner similar to the diesel cycle. The dual-fuel efficiency is typically equivalent to, or better than, that of 100% diesel operation and $NO_x$ and particulate matter emissions are significantly reduced from typical diesel operating levels. Although the heterogeneous dual-fuel $NO_x$ and particulate emission reductions are less than homogeneous dual-fuel system levels, the improved efficiency at all operating conditions and reduced light-load emissions present a better trade-off in many applications.

While heterogeneous dual-fuel systems present many benefits over homogeneous systems, the expense and complexity of high pressure, direct-gas injection systems are prohibitive for many applications. Current direct gas injectors are electronically controlled and hydraulically or pneumatically actuated, requiring additional electronic controls and hydraulic or pneumatic systems for operation. Older, mechanical direct injection systems are much less flexible in control capability, and typically feature cam-actuated poppet valves that require significant additional components for actuation and control, and typically operate at much lower pressure.

The present invention is directed to overcoming the problems set forth above. It is desirable to have a simple, manually selectable combustion system capable of operating in either a diesel or a dual-fuel combustion mode. It is also desirable to have such a combustion system that is applicable to two-and/or four-stroke diesel engines and, desirably, may be easily retrofitted to existing diesel engines or readily applied to new dual-fuel engines. It is further desirable to have such a combustion system that uses a continuous duty pilot injection system to provide an ignition source for dual-fuel operation, and improved exhaust emissions when operating in the neat, or 100%, diesel combustion mode.

SUMMARY OF THE INVENTION

In accordance with one aspect of the present invention, a dual fuel, direct injection combustion system for a diesel engine has a first fuel injector in fluid communication with the source of diesel fuel and is adapted to selectively provide a flow of diesel fuel to the combustion chambers of the engine, and a second fuel injector adapted to continuously provide a pulsed flow of diesel fuel to the combustion chamber during operation of the engine. The second fuel injector serves as a pilot injector that delivers fuel at a rate of no more than about 5% of the flow rate of the first fuel injector. The dual-fuel, direct injection combustion system further includes a third fuel injector that is in fluid communication with a source of a pressurized combustible gaseous mixture and is adapted to selectively provide a flow of the combustible gaseous mixture to the combustion chamber of the engine.

Other features of the dual fuel, direct injection combustion system embodying the present invention include a first injection pump in fluid communication with a source of diesel fuel and a mechanically operable valve in fluid communication with the first injection pump and the first fuel injector. The mechanically operable valve is adapted to selectively direct a flow of diesel flow from the first injection pump to the first fuel injector or, alternatively, to activate a pulsed flow of the combustible gaseous mixture from the third fuel injector. Other features include the third fuel injector having a valve body with a needle rod that is moveable between open and closed positions to control the flow of the combustible gaseous mixture into the combustion chamber of the engine. The needle rod is moved between the open and closed positions in response to pressure pulses provided by the first injection pump and directed through the mechanically operable valve, which selectively directs a flow of diesel fuel to either a first fuel injector or to an actuation chamber in the third fuel injector.

In another aspect of the present invention, a method for operating a dual-fuel, direct injection combustion engine includes continuously injecting a pulsed flow of diesel fuel from a pilot injector in a relatively low amount sufficient to initiate autocombustion of the diesel fuel, and selectively injecting either diesel fuel from a second fuel injector disposed in the combustion chamber or injecting a combustible gaseous mixture from a third fuel injector disposed in the combustion chamber, while maintaining the pulsed flow of diesel fuel from the pilot injector.

BRIEF DESCRIPTION OF THE DRAWINGS

A more complete understanding of the structure and operation of the present invention may be had by reference to the following detailed description, when taken in conjunction with accompanying drawings, wherein.

DETAILED DESCRIPTION OF A PRESENTLY PREFERRED EXEMPLARY EMBODIMENTS

Figure 1:
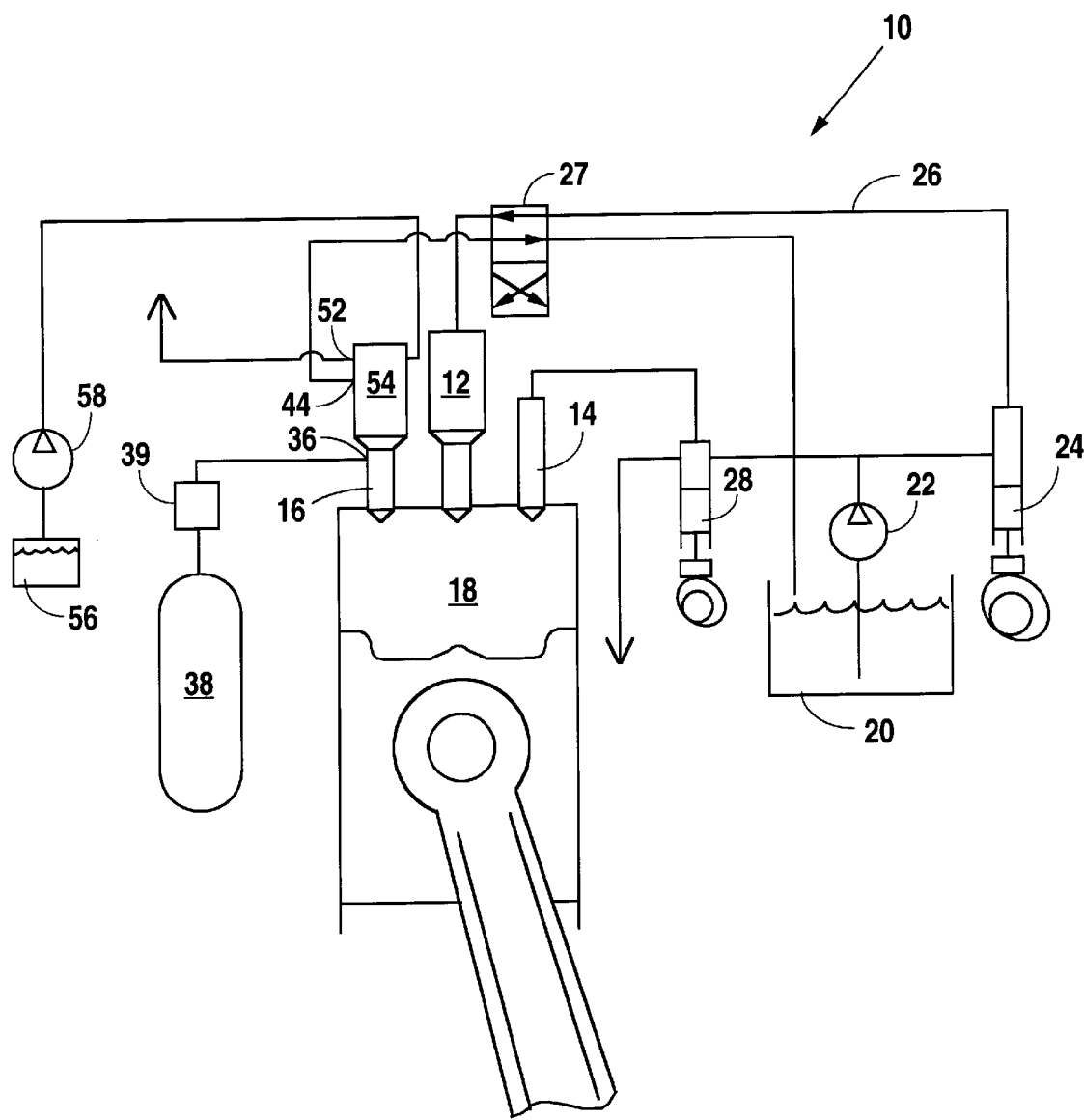
FIG. 1 is a schematic diagram of a dual fuel, direct injection combustion system embodying the present invention.

As shown schematically in FIG. 1, a dual fuel, direct injection combustion system 10, embodying the present invention, includes a first injector 12, a second injector 14 and a third injector 16, all of which have at least a tip portion disposed within a combustion chamber 18 of a diesel engine. The first injector 12 is a conventional diesel fuel injector, such as a DF-2 injector, that is in fluid communication with a source of fuel 20. The second injector 14 is a continuous duty pilot injector, also in fluid communication with the fuel source 20, and is constructed to deliver a pulsed flow of diesel fuel at a relatively low flow rate, e.g., at from about 3% to about 5% of the rate of the primary, or first fuel injector 12. As described in the above-referenced SAE Publication No. 872041, pilot ignition of a gas-air charge can be achieved with pilot fuel quantities as low as 1% of the total fuel energy. The above-referenced Karim article in *Automotive Engine Alternatives* also describes diesel engine operation on reduced pilot fuel quantities that provide a proportional reduction to $NO_x$ emissions. However, normal diesel injection systems designed for single fuel diesel operation typically cannot inject quantities less than 5% at rate of engine speeds, i.e., they have a limited "turn down-"operating capability. The injection pressure at the 5% quantities is low, and the resultant spray characteristics (penetration and automization) are poor. A continuous duty pilot injection system incorporated in the present invention provides a pulsed injection flow rate at from about 3% to about 5% of the total fuel energy during dual-fuel operation at the injector's maximum and most optimum operating condition. This relatively small pilot injection of diesel fuel provides improved spray characteristics, which improves ignition and combustion stability and achieves the lower $NO_x$ emissions benefit due to reduced fuel quantities.

As shown in FIG. 1, a fuel pump 22 provides a pressurized, pulsed flow of diesel fuel to a first injection pump 24 and thence through a fuel line 26 to a two-position, four-way control valve 27 which selectively directs the fuel to either the first fuel injector 12 or, alternatively as described below in greater detail, to an actuation chamber provided in the third fuel injector 16. A second injection pump 28 provides a pressurized, pulsed flow of diesel fuel from the fuel pump 22 to the second, or pilot, fuel injector 14. Under neat diesel operation, the pilot injector 14, along with the conventional diesel injector 12, form a staged (split) injection event. The benefits of reduced $NO_x$ and particulate emissions in a diesel engine adapted for staged diesel injection is discussed in SAE Paper No. 920461, *$NO_x$ Reduction From Diesel Combustion Using Pilot Injection With High Pressure Fuel Injection*, by S. Schundoh, M. Komori, and K. Tsujimura. Significant reductions in $NO_x$ and particulate matter emissions, compared to normal diesel combustion, can be achieved with staged injection due to the reduced ignition delay and ability to retard the main injection timing. Efficiency is also maintained at levels similar to original diesel combustion.

Figure 2:
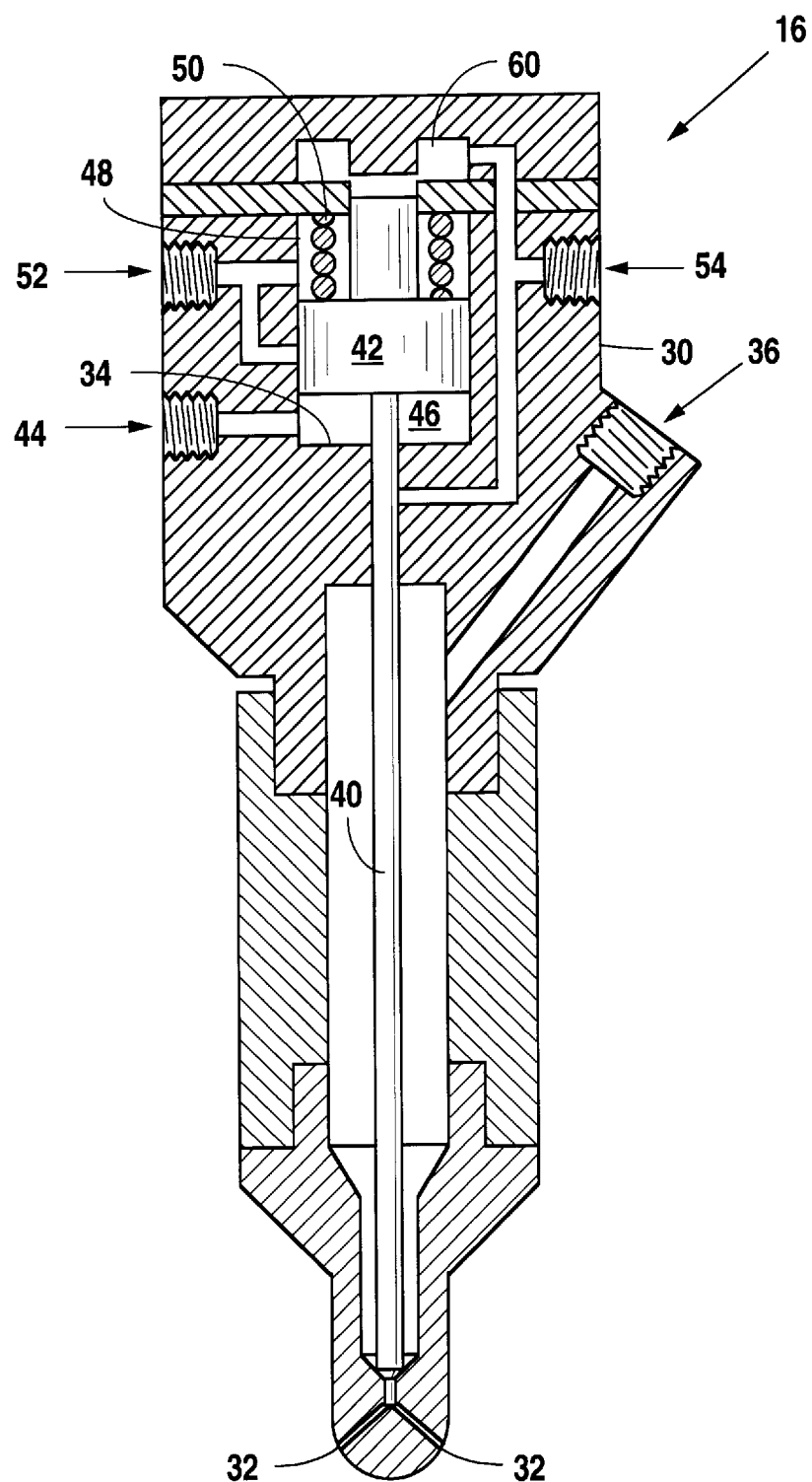
FIG. 2 is a cross-section of a hydraulically actuated, direct gas injector incorporated in the dual fuel, direct injection combustion system embodying the present invention.

As shown in FIG. 2, the third fuel injector 16 is a hydraulically-actuated direct-gas injector having a valve body 30 with at least one, and typically a plurality of, openings 32 in the tip portion of the injector 16 and an enclosed chamber 34 defined within an upper portion of the injector 16. A first inlet port 36 is in fluid communication with a pressurized source 38 of a combustible gaseous mixture, typically compressed natural gas, or methane, propane, or other gaseous fuel mixture that has a pressure controlled by a pressure regulator 39. A needle rod 40, or valve, is centrally disposed within the valve body 30 and is shaped at its lower end to provide a seal to prevent a flow of gas through the openings 32, and permits a flow of the combustible gaseous mixture into the combustion chamber 18 when at an open position. The opposite, or second end of the needle rod includes a piston 42 that is disposed within the enclosed chamber 34 of the valve body 30.

The valve body also has a second inlet port 44 that is in fluid communication with a first portion 46 of the enclosed chamber 34 and in selective communication, by way of the mechanically operable control valve 27 with the first injection pump 24. The valve body 30 further includes an outlet, or spill, port 52 that has a lower passageway formed in the valve body 30 that, during actuation of the injector 16, is in alternating fluid communication with the first portion 46 of the enclosed chamber 34, and an upper passageway in continuous communication with a second portion 48 of the enclosed chamber 34. The first portion 46 of the enclosed chamber 34 is separated from the second portion 48 by the piston 42 disposed on the upper end of the needle rod 40. A spring 50 is disposed within the second portion 48 of the enclosed chamber 34 and is arranged to provide a bias force sufficient to urge the needle rod 40 toward the closed position and keep the injector 16 closed to combustion pressure through the nozzle openings 32.

When operating in a conventional diesel fuel combustion mode, the two-position, four-way control valve 27 is positioned to direct the flow of fuel from the first injection pump to the first fuel injector 12, and the engine operates, in cooperation with fuel injected through the pilot injector 14, to provide staged injection of diesel fuel into the combustion chamber 18. When the control valve 27 is manually, mechanically, or electrically switched to dual fuel operation, diesel fuel is diverted to the second inlet 44 and into the first portion of the enclosed chamber 34 of the third, or direct-gas, injector 16. The high pressure pulsed flow of diesel fuel from the first injector pump 24 provides hydraulic actuation of the piston 42, raising the piston 42 a short distance to the open position and thereby permitting injection of pressurized gas from the pressurized gas source 38 into the combustion chamber 18. When the piston 42 is at its upper travel limit, the pressurized first portion 46 of the enclosed chamber 34 is opened to the spill port 52 and permits diesel fuel in the pressurized first portion 46 of the chamber 34 to be discharged, and if desired, returned to the fuel reservoir 20. Thus, the fuel pulses provided by the first injection pump 24 hydraulically actuate the third fuel injector 16 without the need for an additional electrical or mechanical actuator.

More specifically, the gaseous fuel injector 16, as shown in FIG. 2, has a needle valve 40 attached to a spring-loaded piston 42, which is raised by the hydraulic actuation (diesel) pulse. Pressurized gas in the gas reservoir 38 is then released to the combustion chamber 18 through the nozzle offices 32. The diesel fuel actuation fluid is vented through the lower passageway of the spill port 52 which is uncovered as the piston 42 reaches its maximum travel. Once actuation pressure under the piston 42 drops sufficiently, the piston 42 returns to its lower position and seats the needle valve 40. The spring 50, positioned above the piston 42 aids closure of the needle valve 40 and maintains closure of the needle valve 40 against combustion pressure in the event diesel fuel sealing action, as described below, is lost.

A separate high-pressure, low-volume hydraulic system may be used to provide seal oil, e.g., diesel fuel, which prevents gas leakage into the diesel fuel actuation fluid and also aids in enclosure of the needle valve 40. Preferably, the valve body 30 includes a third inlet port 54 that is in fluid communication with a source of fluid 56, such as diesel fuel which may alternatively be provided by the primary fuel source 20, and which is pressurized to a pressure higher than that of the combustible gaseous mixture by a pump 58. The high pressure fluid is directed through the third inlet port 54 to an intermediate portion of the valve body 30 and provides a fluid seal between the combustible gaseous mixture introduced through the first inlet port 36 and the diesel fuel actuation fluid disposed in the first portion 46 of the enclosed chamber 34. Furthermore, high pressure fluid is also directed to an annular chamber 60 disposed in the upper end of the valve body 30. The annular chamber 60 is in restricted fluid communication with the second portion 48 of the enclosed chamber 34 and thereby provide additional actuation pressure on the upper side of the piston 42 to assure closure of the needle valve 40 in the event diesel fuel actuation pressure is lost.

Thus, it can be seen that the dual fuel, direct injection combustion system embodying the present invention includes three main parts; a standard diesel injection system comprising the first injection pump 24 and the first fuel injector 12, a mechanical direct-gas injection system comprising the source 38 of a combustible gaseous mixture and the third fuel injector 16, and a continuous pilot injection system comprising the second injection pump 28 and the second fuel injector 14. This system allows two operating modes, either neat diesel or dual staged gaseous and diesel fuels, which may be selected by mechanically positioning of the control valve 27 to select the desired mode. Importantly, no internal engine modifications, e.g., compression ratio changes, valve timing adjustments, etc., are required when retrofitting an existing diesel engine. Although the cylinder head, or cylinder liner, must be modified for the addition of the gaseous fuel injector 16 and the pilot fuel injector 14, the only external modifications include the continuous pilot injection pump 28 and the high pressure fluid seal system for the gaseous fuel injector 16.

When modifying an existing conventional diesel engine, the existing diesel injection system is modified by installing the two-position, four-way control valve 27 in the line 26 connecting the first injection pump 24 with the first fuel injector 12. The control valve 27 allows the fuel pulse to pass normally to the original diesel fuel injector 12 when operating in the diesel mode. When mechanically switched to dual-fuel operation, the control valve 27 is switched to divert the diesel fuel pulse to the actuation chamber 34 of the direct-gas injector 16. As described above, the diesel pulse serves as a hydraulic actuation pulse to cause an injection of pressurized gas into the combustion chamber 18. Thus, a diesel engine having the dual fuel, direct injection combustion system embodying the present invention, may be advantageously operated by continuously injecting a pulsed flow of diesel fuel through the pilot injector 14 in relatively small amounts sufficient only to initiate autocombustion of the diesel fuel, and then selectively ejecting either diesel fuel through the first injector 12 or a pressurized combustible gaseous mixture through the direct gas injector 16.

Importantly, the dual fuel, direct injection compression system embodying the present invention provides heterogeneous gas-air charging by late-cycle, direct-gas injection, which eliminates the potential for premature detonation and decreases sensitivity to specific gas compositions, without the need for internal engine modifications. The mechanically controlled, hydraulically-actuated direct gas injection system is also less complex than recent electro-hydraulic systems, and less expensive to construct and maintain. Also, the continuous duty pilot injection system provided by the present invention, provides an improved ignition source at reduced fuel flow rates for dual-fuel operation and improved exhaust emissions for diesel operation.

By eliminating the need for electronic controls in a high-pressure, high-volume hydraulic system, the cost and complexity of the dual-fuel system is minimized. Timing and duration of the gas injection is controlled by a conventional diesel injection pump and governor system. Control of the pilot injection system is also controlled by the same governor system. The pilot injection pump is supplied by the diesel fuel supply system, and only requires the addition of an injection pump, lines and nozzles. Control of the mechanically operable valve 27 may be achieved by mechanical linkage, a manual switch, a hydraulically-actuated switch, or a simple electronic solenoid.

Although the present invention is described in terms of a preferred exemplary embodiment, with specific illustrative constructions and arrangements of the fuel injectors, those skilled in the art will recognize that changes in those constructions and arrangements may be made without departing from the spirit of the invention. Such changes are intended to fall within the scope of the following claims. Other aspects, features, and advantages of the present invention may be obtained from a study of this disclosure and the drawings, along with the appended claims.

What we claim is:

1. A dual fuel, direct injection combustion system for a diesel engine having at least one combustion chamber disposed in said engine, said combustion system comprising:

a first fuel injector in fluid communication with a source of diesel fuel and having a tip portion disposed in said combustion chamber; said first fuel injector being adapted to selectively provide a flow of diesel fuel to said combustion chamber at a rate having a predetermined maximum value;

a second fuel injector in fluid communication with a source of diesel fuel and having a tip portion disposed in said combustion chamber, said second fuel injector being adapted to continuously provide a pulsed flow of diesel fuel to said combustion chamber during operation of said engine, at a rate of no more than about 5% of the predetermined maximum value of the flow rate of said first fuel injector;

a third fuel injector in fluid communication with a source of a pressurized combustible gaseous mixture and having a tip portion disposed in said combustion chamber, said third fuel injector being adapted to selectively provide a flow of said combustible gaseous mixture to said combustion chamber;

a first injection pump in fluid communication with said source of diesel fuel;

a valve in fluid communication with said first injection pump and said first fuel injector and said third fuel injector, said valve being adapted to selectively direct a flow of diesel fuel from said first injection pump to a selected one of said first fuel injector for injection into said combustion chamber and said third fuel injector for actuation of said third fuel injector to direct a flow of combustible gaseous mixture into said combustion chamber; and a second injection pump in fluid communication with said source of diesel fuel and with said second fuel injector.

2. A dual fuel, direct injection combustion system for a diesel engine having at least one combustion chamber disposed in said engine, said combustion system comprising:

a first fuel injector in fluid communication with a source of diesel fuel and having a tip portion disposed in said combustion chamber; said first fuel injector being adapted to selectively provide a flow of diesel fuel to said combustion chamber at a rate having a predetermined maximum value;

a second fuel injection in fluid communication with a source of diesel fuel and having a tip portion in said combustion chamber, said second fuel injector being adapted to continuously provide a pulsed flow of diesel fuel to said combustion chamber during operation of said engine, at a rate of no more than about 5% of the predetermined maximum value of the flow rate of said first fuel injector; and a third fuel injector in fluid communication with a source of a pressurized combustible gaseous mixture being adapted to selectively provide a flow of said combustible gaseous mixture to said combustion chamber and having a tip portion disposed in said combustion chamber, a valve body having at least one opening defined in said tip portion of the third fuel injector, an enclosed chamber defined within said valve body at a position spaced from said tip portion, and a first inlet port in fluid communication with a pressurized source of said combustible gaseous mixture, a needle rod having a first end adapted to seal said at least one opening in said tip portion when the needle rod is at a closed position and direct a flow of said combustible gaseous mixture into the combustion chamber of said engine when the needle rod is at an open position, and a second end having a piston formed thereon and disposed within said enclosed chamber defined in said valve body, a second inlet port formed in said valve body in fluid communication with a first portion of said enclosed chamber and in selective fluid communication with said first injection pump, an outlet port formed in said valve body in alternating fluid communication with said first portion of said enclosed chamber when said first portion is in fluid communication with said first injection pump and in continuous fluid communication with a second portion of said enclosed chamber, said first and second portions of said chamber being separated by said piston formed on the second end of the needle rod, and a spring disposed within said second portion of the enclosed chamber defined within said valve body and arranged to provide a bias force sufficient to urge the needle rod toward said closed position;

a first injection pump in fluid communication with said source of diesel fuel; and a valve in fluid communication with said first injection pump and said first fuel injector, and said third fuel injector, said valve being adapted to selectively direct a flow of diesel fuel from said first injection pump to a selected one of said first fuel injector for injector into said combustion chamber and said third fuel injector for actuation of said third fuel injector to direct a flow of combustible gaseous mixtures into said combustion chamber.

3. A dual fuel, direct injection combustion system, as set forth in claim 2, wherein said mechanically operable valve is also in fluid communication with said second inlet port of the third fuel injector and is adapted to selectively direct a flow of diesel fuel from said first injection pump to said second inlet port of the third fuel injector.

4. A dual fuel, direct injection combustion system, as set forth in claim 2, wherein said third fuel injector includes a third inlet port in fluid communication with a source of pressurized fluid and in restricted fluid communication with said first and second portions of the enclosed chamber defined in said valve body.

* * * * *